July 2, 1968  G. M. STEIN ET AL  3,391,364
INTERLEAVED TURN, HIGH SERIES CAPACITANCE
ELECTRICAL WINDING STRUCTURE
Filed July 8, 1966  2 Sheets-Sheet 2

United States Patent Office 3,391,364
Patented July 2, 1968

3,391,364
INTERLEAVED TURN, HIGH SERIES
CAPACITANCE ELECTRICAL WIND-
ING STRUCTURE
Gerhard M. Stein, Sharon, Pa., and Stephen G. Vargo,
Campbell, Ohio, assignors to Westinghouse Electric Cor-
poration, Pittsburgh, Pa., a corporation of Pennsylvania
Filed July 8, 1966, Ser. No. 563,768
10 Claims. (Cl. 336—70)

ABSTRACT OF THE DISCLOSURE

An electrical winding structure for transformers hav-
ing a plurality of serially connected pancake coils of
the interleaved turn high series capacitance type. Certain
of the pancake coils adjacent the line end, or ends, of
the winding are constructed to have more conductive
strands per turn, and fewer turns, than the remaining
pancake coils.

This invention relates in general to electrical inductive
apparatus, such as transformers, and more particularly
to winding structures for electrical inductive apparatus.

Certain types of electrical inductive apparatus, such
as transformers, include high and low voltage winding
assemblies concentrically disposed about a magnetic core,
with the high voltage winding comprising a plurality of
electrically connected pancake or disc type coils disposed
in spaced side-by-side relation. One end of the high volt-
age winding is connected to a source of alternating po-
tential, and the other end of the winding may be grounded,
or it may also be connected to the source of alternating
potential. Under steady-state conditions, the voltage be-
tween adjacent pancake coils is substantially the same
across the winding, and the voltage distribution across
the winding to ground is substantially linear.

When the high voltage winding is subjected to a
lightning surge, a switching surge, or other voltage tran-
sient having a relatively steep wave front, it is the char-
acteristic of the winding to cause the surge to be un-
evenly distributed across the winding, with the electrical
stresses at the end of the winding to which the surge
was applied being much greater than the steady-state
values. Thus, the voltage stresses between adjacent pan-
cake coils at this end of the winding, between the turns
of these pancake coils, and between these pancake coils
and ground, being much greater than the steady-state
or inductive distribution of the line voltage across the
winding, must be taken into consideration when design-
ing the apparatus. This non-linearity in the distribution
of surge potentials is a function of the square root of
the ratio of the capacitance of the pancake coils to
ground to the through or series capacitance of the pan-
cake coils. The smaller this ratio, called the distribu-
tion constant alpha ($\alpha$) of the winding, the more linear-
ly a surge voltage will be distributed across the winding.
In other words, a surge voltage is distributed across
the winding primarily due to the capacitive structure of
the winding, rather than its inductive structure. Not only
does this type of winding structure cause the winding
to be subjected to a non-linear distribution of a surge
potential, but as the distribution of a surge potential
changes from capacitive to inductive, voltage oscillations
of large magnitude are produced, with the magnitude
being directly responsive to the difference between the
initial or capacitive distribution and the steady-state or
inductive distribution.

Attempts to grade the turn-to-turn insulation, and in-
sulation between adjacent pancake coils by increasing the
thickness of the insulation at the points of high elec-
trical stress, are at least partially self-defeating, as in-
creasing the thickness of the insulation at these points
reduces the effective series capacitance of the winding
which causes an even more unfavorable surge voltage
distribution, as evidenced by the formula for the distribu-
tion constant $$\alpha = \sqrt{\frac{C_g}{C_s}}$$

where $C_g$ is the capacitance of the winding to ground
and $C_s$ is the series capacitance of the winding. Thus, in-
creasing the thickness of the insulation increases the elec-
trical stress at these points, which again requires addi-
tional insulation. Increasing the thickness of the insula-
tion is also undesirable from another viewpoint as it in-
creases the space factor of the winding. Increasing the
space factor of the winding deleteriously affects its cost
and performance, as it increases the mean length of the
winding turns and the mean length of the magnetic cir-
cuit. Therefore, insulation grading is, in general, unde-
sirable unless it is coupled with a structure which in-
creases the series capacitance of the winding at the same
rate the series capacitance of the winding is being de-
creased due to the grading of the insulation.

In a winding comprising conventional pancake coils,
with "conventional pancake coil" referring to the type of
pancake coil which includes a plurality of radially dis-
posed conductor turns in which the electrical location
of the conductor turns correspond to their mechanical
location, the capacitances between turns of the pancake
coils are effectively connected in series. Since series con-
nected capacitors add in a manner similar to parallel
connected resistors, the effective series capacitance of
the pancake coils and winding due to the capacitances
between adjacent turns in each pancake coil is very small.
The capacitance between adjacent pancake coils, being
effectively parallel connected, thus adds in a manner
similar to series connected resistors and forms the major
portion of the series capacitance of a winding made up
of conventional pancake coils.

Many successful winding arrangements have been de-
veloped to increase the series capacitance of an electrical
winding by winding the pancake coils to include a plural-
ity of sections, the turns of which are interleaved. The
sections are electrically connected to physically place
one or more turns of the pancake coil between elec-
trically connected turns, with the interleaving turns being
electrically from a different portion of the pancake coil.
This effectively connects the turn-to-turn capacitances in
a series-parallel network which increases the effective
series capacitance of the winding many times. The proc-
ess of disposing turns from another portion of the wind-
ing between electrically connected turns is called "inter-
leaving," a term well known in the art. Examples of in-
terleaving arrangements for increasing the effective series
capacitance of an electrical winding are disclosed in
U.S. Patent 3,090,022 issued May 14, 1963, which is
assigned to the same assignee as the present application.

It is known, however, that the interleaved type of pan-
cake coil has certain limitations from the standpoint of
increasing the series capacitance of the coil. The turn-to-
turn capacitances of an interleaved pancake coil appear to
be effectively connected in parallel under surge conditions,
only if its natural oscillating period is small compared with
the rise or fall time of the applied surge potential. In
other words, the charging time of the spiral electrodes
must be short compared to the rise time of the wave front
of the applied surge potential. If the natural oscillatory
period of the pancake coils becomes too large, the effective
series capacitance of the interleaved type pancake coil is
gradually reduced to the condition of the conventional
non-interleaved pancake coil, and the electrical stresses
at the end of the winding to which the surge potential is applied increases accordingly. It is also known that the increase in the electrical stresses at the line end of the winding to which the surge potential is applied, due to a relatively long oscillatory period, is a function of the number of turns in each interleaved group of turns. In other words, the voltage stress between the pancake coils adjacent the line end of the winding, between the adjacent turns in these pancake coils, and between these pancake coils to the adjacent low voltage winding and ground, increases with the number of turns in the pancake coils when the oscillatory period of the pancake coils is long relative to the rise or fall time of an applied surge potential. The solution to the increased electrical stress problem which occurs with windings having a relatively long oscillatory period, however, is not as simple as merely reducing the number of turns in the pancake coils adjacent the line end or ends of the winding. Any reduction in the number of turns in the pancake coils must not be accompanied with a change in the effective series capacitance of these pancake coils, or the effort will be self-defeating in a manner similar to that described relative to grading the insulation without an accompanying change in the coil structure which prevents the series capacitances of the line end pancake coils from decreasing.

Accordingly, it is an object of the invention to provide a new and improved winding structure for electrical inductive apparatus.

Another object of the invention is to provide a new and improved winding structure for electrical inductive apparatus which reduces the maximum electrical stress in the winding due to surge potentials.

A further object of the invention is to provide a new and improved winding structure for electrical inductive apparatus which will reduce the natural oscillatory period of a pancake coil without substantially changing its effective series capacitance.

Still another object of the invention is to provide a new and improved winding structure for electrical inductive apparatus which allows the number of turns in an interleaved turn type pancake coil to be reduced without substantially changing the effective series capacitance of the pancake coil.

Briefly, the present invention accomplishes the above cited objects by increasing the number of conductive strands per turn in certain of the interleaved turn pancake coils adjacent the line end or ends of the winding, with the conductive strands which form the conductor turns being connected in parallel, and disposed radially with respect to the axis of the pancake coil. The number of conductive strands per turn in the remaining interleaved turn pancake coils of the winding is unchanged. The radial stranding of the conductive turns decreases the number of turns per interleaved section if the same radial build of the pancake coils is maintained. Although there are fewer effective conductor turns, the stranding of the turns increases the series capacitance of the pancake coil. If it is desirable to keep the series capacitance substantially uniform in all sections of the winding, the increase in series capacitance of the pancake coils which have the additional strands per turn may be offset by reducing the axial width of the conductive strands. This also has the beneficial effect of reducing the axial space occupied by each of the pancake coils which have the additional conductive strands per turn, compared with the remaining pancake coils, which reduces the electrical stress across these pancake coils. Thus, the pancake coils adjacent the line end or ends of the winding which are connected to a source of electrical potential have fewer turns but more conductive strands per turn than the remaining pancake coils. If the high voltage winding is tapped, the section of the winding which has more turns but fewer conductive strands per turn may be confined to the tapped sections, which will achieve the objects and results of the invention and at the same time facilitate the making of the various tap connections on the winding.

Further objects and advantages of the invention will become apparent from the following detailed description, taken in connection with the accompanying drawings, in which.

Figure 1:
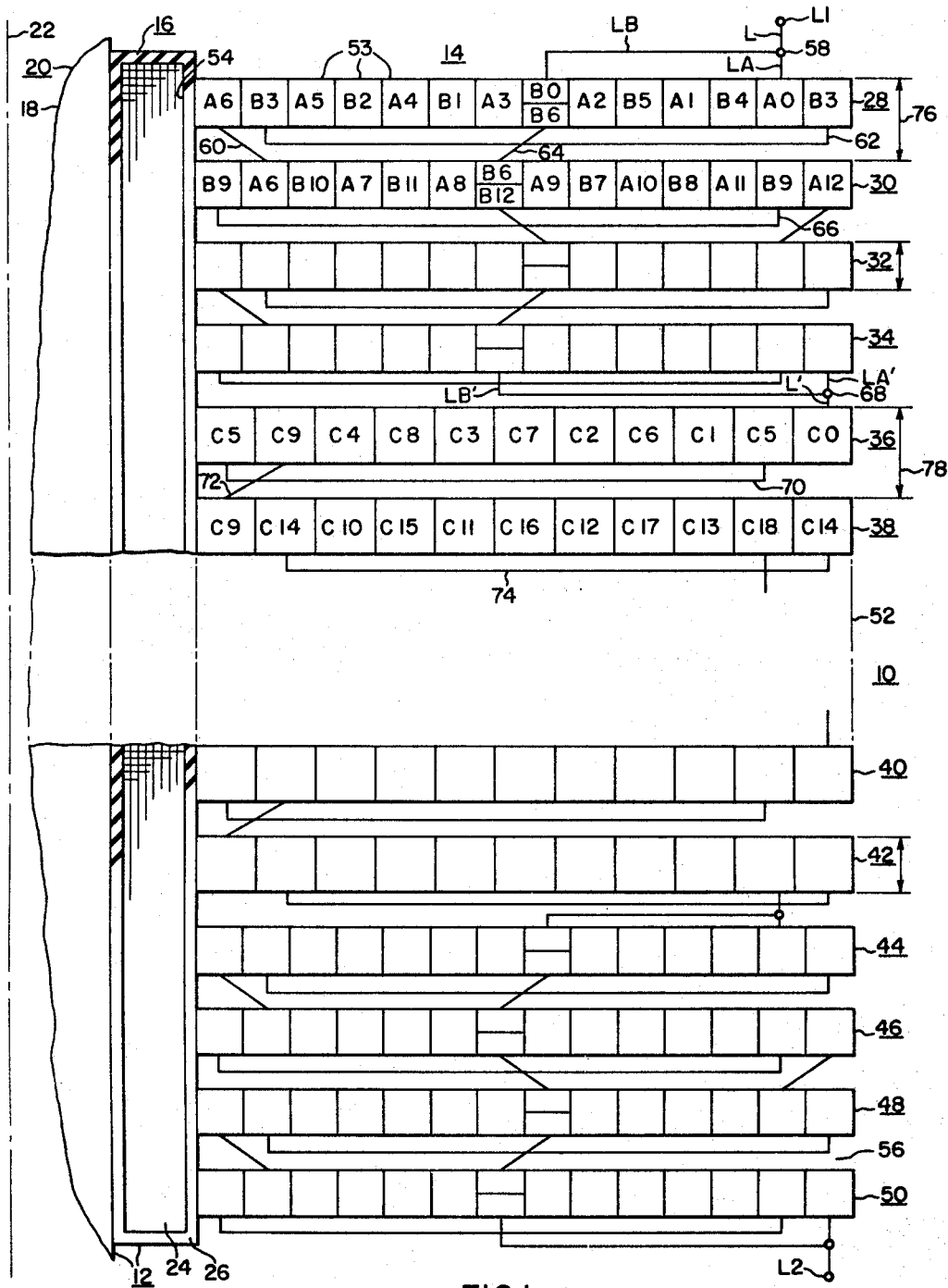
FIGURE 1 is a partial sectional elevation of the magnetic core and windings of a transformer constructed according to the teachings of the invention.

Referring now to the drawings, and FIG. 1 in particular, there is shown a partial sectional elevation of a magnetic core-winding assembly 12 of a transformer 10 constructed according to the teachings of the invention. The magnetic core-winding assembly 12 includes high and low voltage windings 14 and 16, respectively, concentrically disposed about a leg 18 of a magnetic core assembly 20, in what is commonly referred to as "core form" construction. Transformer 10 may be either single or polyphase, with only one phase being illustrated in order to simplify the drawings. Transformer 10 may be of the isolated winding type, with each end of the high voltage winding 14 being adapted for connection to a source of electrical potential, as shown in FIG. 1, or one end may be adapted for connection to ground, depending upon the particular requirements of the application. Transformer 10 may also be of the auto-transformer type if desired. The high and low voltage windings, 14 and 16, respectively, are concentrically or coaxially disposed relative to an axis or center line 22, with the windings only being shown on one side of center line 22, as their views on the other side of the center line are similar.

Low voltage winding 16 may be of any conventional type, having a plurality of conductor turns 24 which are insulated from the magnetic core 22 and high voltage winding 14 by insulating means 26.

High voltage winding 14 includes a plurality of pancake or disc type coil sections of which pancake coils 28, 30, 32, 34, 36 and 38 are shown adjacent line terminal L1, and pancake coils 40, 42, 44, 46, 48 and 50 are shown adjacent line terminal L2. It is to be understood that the invention applies to any plurality of pancake coils, with additional pancake coils being indicated generally at 52.

Each of the pancake coils, such as pancake coil 28, includes a plurality of conductor turns 53 spirally wound about an opening 54 for receiving winding leg 18 of magnetic core 20 and low voltage winding 16, forming a substantially disc shape having first and second outer major opposed surfaces and a predetermined radial build or outside diameter. The various pancake coils are stacked with their openings in alignment, with their major surfaces in spaced parallel relation with one another, to form cooling ducts between the adjacent coils, such as cooling duct 56 between pancake coils 48 and 50. The plurality of pancake coils are electrically connected in series, either with start-start, finish-finish connections as shown in FIG. 1, or with finish-start connections. As used in this specification, the "start" of a pancake coil is always the end of one of its inner turns, and the "finish" of the winding is always the end of one of its outer turns, regardless of where the connections to the pancake coils are made.

The magnetic core-winding assembly 12 may be disposed in a suitable casing or tank (not shown), which may be filled to a predetermined level with a fluid insulating and cooling medium, such as oil or $SF_6$.

A surge potential applied to one of the line terminals, such as terminal L1 or L2 of winding 14, will tend to concentrate on the first few pancake coils at this end of the winding, increasing the voltage between adjacent pancake coils at this end of the winding, increasing the voltage from these pancake coils to ground, and increasing the turn-to-turn voltage in these pancake coils. The extent of this non-linearity in surge voltage distribution, as hereinbefore mentioned, is determined by the distribution constant α of the winding, with the smaller the distribution constant, the more linear the distribution of surge potentials across the winding. The distribution constant α may be made smaller by increasing the series capacitance of the pancake coils and the winding. Grading the insulation at the points of higher electrical stress, without a change in structure to prevent the grading from reducing the series capacitance of the pancake coils, is thus self-defeating, as it either increases the distribution constant of the winding, which causes the voltage distribution to be even more non-linear, or it upsets the balance of series capacitance throughout the winding, causing more electrical stress to be concentrated on the line end of the winding, in the event the center portion of the winding has an increased series capacity. Thus, grading the insulation by itself is not a solution to the non-linear distribution of surge potential across the winding.

The usual approach in reducing the distribution constant α is to increase the series capacitance of the pancake coils and the winding by forming the pancake coils in two or more sections and connecting the sections to interleave the turns of the sections, which changes the turn-to-turn capacitances from a series network to a series-parallel network, which substantially increases the series capacitance of the pancake coils and winding. It should be realized, however, that the interleaved turn type pancake coil only appears to be a series-parallel network when the natural oscillatory period of the winding is short compared with the front time of the wave front of an applied surge potential. Taking the hypothetical condition of a surge potential having a perpendicular wave front, the pancake coil would appear to be a conventional non-interleaved pancake coil to the surge potential, regardless of how it was connected, as there would be no current flow at the instant the surge is applied to the winding and the connections of the turns would be immaterial. The wave front of a surge potential, however, will always have a finite rise and fall time due to the inductance of the electrical conductors connected to the first pancake coil adjacent the line terminal to which the surge potential is applied. In a conventional non-interleaved type pancake coil, a surge potential causes current to flow at least through the turn adjacent the line terminal and through any static plates that may be used. After charging the static plate and first conductor turn, the current seems to prefer the shorter and less inductive path through the dielectric between turns and between adjacent pancake coils, to the higher inductive path through the other conductor turns. This places the various turn-to-turn capacitances in series, which reduces the effective series capacitance of the pancake coils. In an interleaved turn type pancake coil, electrically distant turns are placed between electrically connected turns and the current, after flowing through the first turn, seems to prefer the path through the other conductor turns to the path through the dielectric between them, and this flow charges the capacitances between adjacent turns of an interleaved group in parallel which thus increases the effective series capacitance of the pancake coil. However, in an interleaved turn type coil, it is known that if one-quarter period of the natural oscillation of the pancake coil occurring during the charging or discharging period becomes longer than the wave front time of the surge potential, the paralleling effect is reduced, and the interleaved turn type pancake coil starts to approach the condition of a non-interleaved pancake coil, increasing the stress on the line end of the winding accordingly. The increase in voltage on the line end of the winding to which the surge potential is applied, on windings in which its pancake coils have a relatively long natural oscillatory period, is a function of the number of conductor turns per interleaved group. Thus, the stress at the line end may be reduced for pancake coils having a relatively long natural oscillatory period, by reducing the number of conductor turns in the pancake coils adjacent the line end of the winding, if this can be accomplished without reducing the series capacitance of these coils. This invention teaches how this may be accomplished.

More specifically, FIG. 1 teaches a high voltage winding arrangement 14 in which all of the pancake coils have at least two sections, the turns of which are interleaved to increase the series capacitance of the pancake coils, and in which a selected number of pancake coils adjacent the line end or ends of the winding have fewer effective turns than the remaining pancake coils. This is accomplished by increasing the number of conductive strands per turn in the radial direction in the selected pancake coils, compared with the conductive strands per turn in the remaining pancake coils, while maintaining substantially the same radial build for all of the pancake coils. As shown in FIG. 1, winding 14 has two line ends, which are connected to line terminals L1 and L2, respectively. The pancake coils selected to have fewer effective turns than the remaining pancake coils are pancake coils 28, 30, 32 and 34 adjacent line terminal L1, and pancake coils 44, 46, 48 and 50 adjacent line terminal L2. The remaining pancake coils 36, 38, 40 42, and those shown generally at 52, have more turns than the selected pancake coils.

Assuming that pancake coils 36, 38, 40, 42 and those shown generally at 52 have a single conductive strand per turn, the selected pancake coils at the line ends of the winding may have two conductive strands per turn disposed in the radial direction, with the conductive strands being connected in parallel. The particular interleaving arrangements utilized to obtain an increase in the effective series capacitance of each pancake coil is not critical. The degree of interleaving for the single conductor per turn pancake coils and the double conductor per turn pancake coils may be chosen to be the same, if desired, so there will be no unbalance in series capacitance across the winding due to different degrees of interleaving. Thus, the double conductor per turn pancake coils, such as pancake coil 28, may be mutually single interleaved as disclosed in co-pending application Ser. No. 351,674 filed Mar. 13, 1964, now Patent 3,299,385, which is assigned to the same assignee as the present application, and the single conductor per turn pancake coils, such as pancake coil 36, may be single interleaved as disclosed in U.S. Patent 3,090,-022, hereinbefore referred to.

Briefly, the double conductor per turn pancake coils may be formed by spirally winding two conductors together, with one of the conductors being severed at substantially the midpoint of the radial build. The main conductor L connected to line terminal L1, is split into two conductors, LA and LB, with conductor LA being connected to the outer end of turn A0, which is the end of the uncut section. This circuit, which will be called the "A" circuit, then spirals inwardly, appearing at every other turn, which are referenced A1, A2, A3, A4, A5 and A6. At the end of inner turn A6, the circuit continues via conductor 60 to the inner end of turn A6 in pancake coil 30, which is the end of the uncut section in this coil, and the circuit spirals outwardly, appearing at turns A7, A8, A9, A10, A11, and A12. This same sequence and procedure for the "A" circuit is continued in pancake coils 32 and 34.

Conductor LB is connected to the outer end of the inner half of the split radial section, starting at the end of turn B0, and this circuit, which will be called the "B" circuit, spirals inwardly, appearing at alternate turns B1, B2, and B3. At B3, the circuit continues via conductor 62 to the outer end of the outer half of the split radial section, to the end of turn B3, and spirals inwardly, appearing at alternate turns B4, B5 and B6. At turn B6, the "B" circuit continues via conductor 64 to the inner end of the outer half of the split radial section, starting at turn B6 and spiralling outwardly, appearing at turns B7, B8 and B9. At turn B9, the "B" circuit continues via conductor 66 to the inner end of the inner half of the split radial section, starting at turn B9 and spiralling outwardly, appearing at turns B10, B11 and B12. This same procedure is then followed for the "B" circuit in pancake coils 32 and 34.

When pancake coil 34 is completed, which is the end of the double conductor per turn pancake coils at this end of the winding 14, conductors LA' and LB' are connected together at terminal 68, to complete the parallel connection of the "A" and "B" circuits.

Since winding 14 has both ends connected to the line, pancake coils 44, 46, 48 and 50, adjacent line terminal L2, may be constructed and connected in the same manner as pancake coils 28, 30, 32 and 34. If the ends of winding 14 opposite terminal L1 were to be grounded, then it would only be necessary to construct pancake coils 28, 30, 32 and 34 with more strands per turn than the remaining pancake coils.

While pancake coils 28, 30, 32 and 34 have been shown and described as being start-start, finish-finish connected, it will be obvious that they may also be finish-start connected by winding all of these pancake coils in the same manner as pancake coils 30 and 34.

Upon reaching pancake coil 36, the double conductors are joined to form a single conductor. The single conductor per turn pancake coils may be formed by spirally winding two conductors together and connecting the inner turn of one of the resulting radial sections, to the outer turn of the remaining radial section. Thus, conductor L' may be connected to the end of the outer turn of one of the radial sections, such as turn C0, and the circuit will spiral inwardly, appearing at alternate turns C1, C2, C3, C4 and C5. At turn C5, the single series circuit in pancake coil 36 is continued via conductor 70 to the outer end of turn C5 of the remaining radial section, and the circuit again spirals outwardly, appearing at alternate turns C6, C7, C8 and C9. At the end of turn C9, the circuit is continued via conductor 72 to the end of inner turn C9 of one of the radial sections, spiralling outwardly to the end of turn C14, returning via conductor 74 to the inner end of turn C14 of the remaining radial section, and again spiralling outwardly to complete the pancake coil at the end of turn C18. The same sequence and procedure is then followed for the remaining single conductor per turn pancake coils. It will be obvious that the single conductor per turn pancake coils may also be finish-start connected, instead of start-start, finish-finish connected, by winding all the single conductor per turn pancake coils similar to pancake coil 38.

Thus, the double conductor per turn pancake coils, having the same radial build as the single conductor per turn pancake coils, have fewer effective turns than the single conductor per turn pancake coils. The double conductor per turn pancake coils in the example shown in FIG. 1 have six turns, while the single conductor per turn pancake coils have nine. Further, this reduction in the number of turns in the selected line end coils has been accomplished without reducing the series capacitance of these coils. Therefore, the electrical stress at the line end of winding 14 has been reduced, compared to a winding in which all of the pancake coils have the same number of strands per turn, reducing the electrical stress at the line end of a winding for surge potentials having a very steep wave front, relative to the natural oscillation period of the winding, compared with a winding in which all of the pancake coils have the same number of conductive strands per turn.

Increasing the number of conductive strands per turn while maintaining the same radial build, while reducing the effective turns in the pancake coil, increases the number of parallel connected capacitances, which increases the series capacitance of these pancake coils. If it is desired to maintain the series capacitance in the selected line end coils the same as in the remaining pancake coils, this may be accomplished by reducing the axial width of the conductors in the selected line end coils. This avoids any discontinuity in the series capacitance of the winding across its length, and provides a surge voltage distribution per unit length across the winding, and from the winding to ground, which is substantially the same as in a corresponding winding with the same insulation clearances having single conductor per turn interleaved pancake coils, similar to pancake coil 36, throughout the winding, except that the winding will more uniformly distribute surge voltages having a faster rise time than would a corresponding winding having single conductor per turn pancake coils. However, reducing the axial width of the conductors in the selected pancake coils at the line end of the winding allows the axial space 76 required per pancake coil in the selected pancake coil section to be reduced, compared with the axial space 78 of one of the remaining pancake coils, without reducing the width of the coil ducts between adjacent pancake coils. Thus, the stress across each selected pancake coil at the line end or ends of the winding is reduced by the ratio of the axial space required for one of the selected pancake coils, to the axial space required by one of the remaining pancake coils. Thus, the construction shown in FIG. 1 is beneficial in reducing the electrical stress across the line end pancake coils, even where the oscillatory period time of the winding compared to the rise time of the applied surge potential is not a problem.

The structure shown in FIG. 1 also has the advantage of reducing eddy current losses in the sections of the winding which have more conductive strands per turn. The leakage flux in concentric windings has a radial component at the ends of the winding which produce eddy current losses in the conductors of the pancake windings. The eddy current losses in a conductor vary directly with the square of the dimension of the conductor at right angles to the direction of the leakage flux. Therefore, dividing the conductor into two or more conductive strands substantially reduces losses due to eddy currents.

In general, the insulation between turns in the pancake coils throughout the length of the winding is chosen to be the same, which requires all of the insulation between the conductive strands to be of a thickness designed to withstand the higher strand-to-strand stresses in the pancake coils at the line end or ends of the winding. If the insulation thickness is reduced in the pancake coils at the center section or portion of the winding, where both ends of the winding are connected to the alternating potential, or in all of the coils except those at the line end on windings which have one end grounded, the series capacitance of the winding is increased, except at the line end or ends, which is undesirable as it further increases the stresses at the line end. U.S. Patent 3,246,270 issued Apr. 12, 1966 and assigned to the same assignee as the present application, teaches how the insulation may be graded by using different degrees of interleaving in the various sections of the winding to maintain substantially the same series capacitance in all of the sections of the winding. The teachings of the present invention also allows the insulation to be graded, but by obtaining uniform capacitance from section to section by a totally different approach.

Figure 1A:
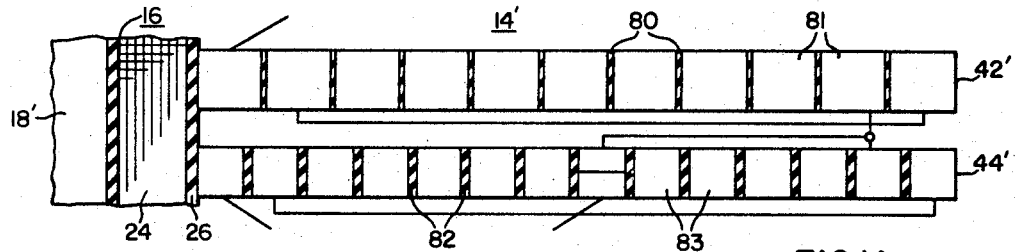
FIG. 1A is a fragmentary view of a portion of the magnetic core and windings of FIG. 1, illustrating another embodiment of the invention.

More specifically, by keeping the same axial conductor width in all of the pancake coils of FIG. 1, both in the selected pancake coils and in the remaining pancake coils, the series capacitance of the selected coils will be increased over that of the remaining pancake coils. This reduces the electrical stress at the line ends of the winding which allows the turn-to-turn insulation in the pancake coils at the line end to be reduced. Since the turn-to-turn stresses in the winding further away from the line ends will be even less than at the line ends, the strand-to-strand insulation in these coils can be reduced even further than in the selected coils at the line ends. In a conventional winding in which all the pancake coils have the same number of conductive strands per turn, this would increase the series capacitance of the center of the winding over that of the end section. However, in the construction of FIG. 1, the larger number of conductive strands and thus larger number of parallel connected capacitances allows the strand-to-strand insulation to be reduced in the selected pancake coils to accommodate the lower stresses due to the higher series capacitance of the line sections of the winding, and the strand-to-strand insulation in the remaining pancake coils can be reduced even more, to accommodate the still lower stresses in these coils, without increasing the series capacitance of the center section of the winding compared with the end section or sections. Thus, graded insulation is achieved while maintaining the series capacitance of the center section of the winding the same or lower than the line end section, without changing the degree of interleaving in the various sections. In certain instances, the grading of the strand-to-strand insulation may be achieved, even though the axial width of the conductors in the selected line end coils is reduced slightly compared to the axial width of the conductors in the remaining pancake coils. This grading of the pancake coil strand-to-strand insulation from section-to-section is illustrated in FIG. 1A, which is a fragmentary view of pancake coils 42 and 44 of FIG. 1, with pancake 44 in this instance being shown with the same axial conductor width as the conductors of pancakes 12, 42. Like reference numerals in FIGS. 1 and 1A indicate like components, with the reference numerals of FIG. 1A including prime marks where necessary to distinguish them from FIG. 1. It will be noted that the insulation 80 between the turns 81 of pancake coil 42' is thinner than the insulation 82 between the turns 83 of pancake coil 44'.

Figure 2:
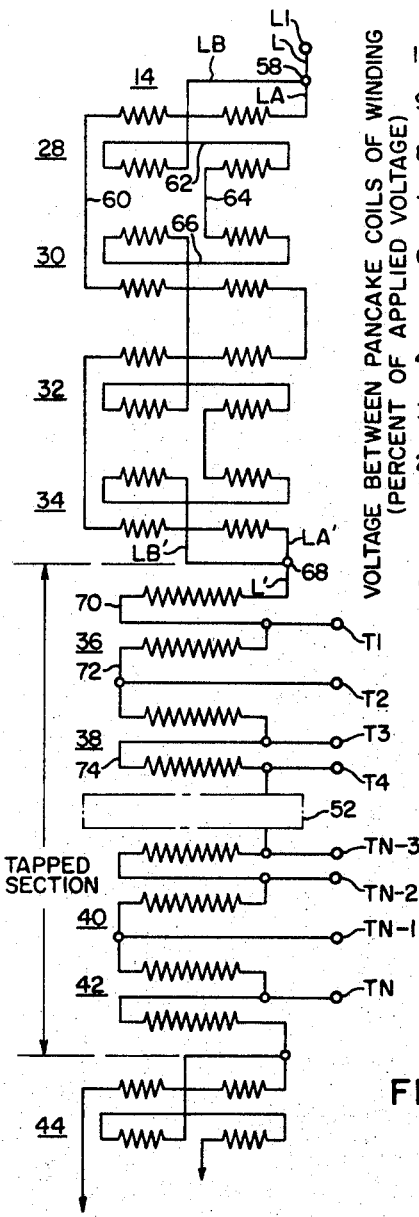
FIG. 2 is a schematic representation of the high voltage winding shown in FIG. 1, illustrating another embodiment of the invention.

FIG. 2 is a schematic representation of the winding arrangement shown in FIG. 1 with like reference numerals in FIGS. 1 and 2 indicating like components. FIG. 2 has been included to illustrate another embodiment of the invention, which may be utilized when the high voltage winding has a tapped section or sections. When the high voltage winding is to include a plurality of tap connections, it is advantageous to confine the pancake coils which have the fewer number of conductive strands per turn to the tapped section or sections. The tapped section or sections should thus be disposed at or near the center of the winding. The objectives and results of the invention may still be achieved, and it facilitates bringing out the tap connections, such as taps T1 through TN shown in FIG. 2, as they are required to be made to a fewer number of conductive strands at each connection point.

Figure 3:
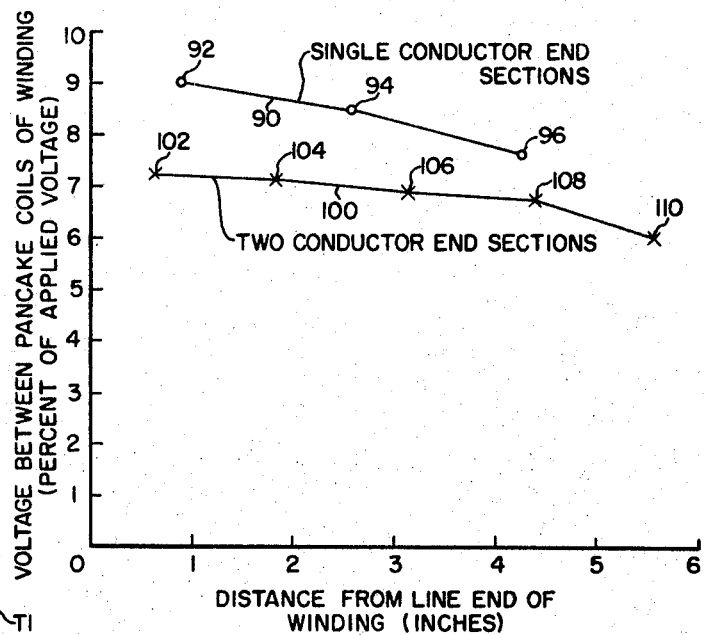
FIG. 3 is a graph comparing the surge voltage responsive stress near the line end of a winding constructed according to the teachings of the invention, with a winding of conventional construction.

The reduction in electrical stress at the line end of the high voltage winding of an electrical transformer constructed according to the teachings of the invention was convincingly illustrated on a power transformer rated 12 MVA. The transformer was first constructed using all single conductor interleaved turn pancake coils in the high voltage winding, similar to pancake coils 36 and 38 in FIG. 1, and the voltage between the pancake coils was measured at different points spaced from the line end. FIG. 3 is a graph which illustrates the results of the test, with the voltage between pancake coils in percent of the applied voltage being plotted on the ordinate, and the distance from the line end in inches being plotted on the abscissa. The line 90 connecting test points 92, 94 and 96 illustrates the voltage magnitude at the line end of the winding using single conductor per turn pancake coils throughout the windings. Selected pancake coils at the line end of the winding were replaced with two conductor per turn pancake coils constructed similar to pancake coils 28 and 30 shown in FIG. 1. The voltage at various points of the line end of the winding were again measured, with the line 200 connecting test points 102, 104, 106, 108 and 110, illustrating the marked reduction in electrical stress over the same transformer using single conductor per turn end sections.

It is to be understood that the invention is not to be limited to the specific interleaving arrangements shown in FIG. 1. For example, instead of the end section or sections being mutually singly interleaved, they may use the two conductor single self-interleaving disclosed in co-pending application Ser. No. 375,489, filed June 16, 1964, now Patent 3,278,879, and assigned to the same assignee as the present application. Further, instead of single interleaving the various sections of the winding, they may be normally twin interleaved, double interleaved, or otherwise multiple interleaved, as taught in the hereinbefore mentioned co-pending patent application and United States patent. The center section and higher strand per turn end sections will usually both employ the same degree of interleaving, but it is not essential. By varying the degrees of interleaving in the various sections of the winding, the teachings of the invention may be utilized to obtain other winding characteristics. It should be further understood that the invention applies generally to increasing the number of conductor strands per turn in selected pancake coils at the line end or ends of the winding, over the remaining pancake coils. In other words, in some instances, it may be necessary to normally use more than one conductive strand per turn in all of the pancake coils. In this instance, the selected pancake coils, according to the teachings of the invention, should utilize a still higher number of conductive strands per turn. For example, if the pancake coils of a predetermined winding have two conductive strands per turn, the selected pancake coils at the line end or ends of the winding may have three, four, or more conductive strands per turn.

Since numerous changes may be made in the above described apparatus and different embodiments of the invention may be made without departing from the spirit thereof, it is intended that all matter contained in the foregoing description or shown in the drawings shall be interpreted as illustrative and not in a limiting sense.

We claim as our invention:

1. A winding for electrical inductive apparatus comprising a plurality of interleaved turn type pancake coils each having a predetermined series capacitance and a plurality of insulated conductor turns, said pancake coils being disposed in predetermined spaced relation about a common axis and electrically connected to form a winding structure having first and second ends, at least the pancake coil at the first end of said winding structure being adapted for connection to a source of electrical potential, a predetermined number of said pancake coils immediately adjacent the first end of said winding structure having more conductive strands per conductor turn and fewer turns than the remaining pancake coils.

2. The winding of claim 1 in which the axial width of the conductive strands in each of said predetermined number of pancake coils is less than the axial width of the conductive strands in the remaining pancake coils.

3. The winding of claim 1 in which the conductive strands which make up the turns of each of said predetermined number of pancake coils are connected in parallel.

4. The winding of claim 1 in which each of said predetermined number of pancake coils has thicker strand-to-strand insulation than the strand-to-strand insulation in the remaining pancake coils.

5. The winding of claim 1 in which the conductor turns of all of said plurality of pancake coils have substantially the same width, and said predetermined number of pancake coils have thicker strand-to-strand insulation than the remaining pancake coils.

6. The winding of claim 1 in which each of said predetermined number of pancake coils have the conductive strands of its conductor turns disposed radially with respect to the axis of the winding.

7. The winding of claim 6 in which the radial build of each of said predetermined number of pancake coils is substantially the same as the radial build of the remaining pancake coils.

8. The winding of claim 1 in which certain of the plurality of pancake coils, other than those immediately adjacent the first end of said winding structure, have tap connections thereon, all of the remaining pancake coils, including those immediately adjacent the first end of said winding structure, having more conductive strands per conductor turn and fewer turns than said certain pancake coils having tap connections thereon.

9. The winding of claim 1 in which both the first and second ends of said winding structure are adapted for connection to an electrical potential, a predetermined number of pancake coils immediately adjacent said first and second ends of said winding structure having more conductive strands per turn and fewer turns than the remaining pancake coils.

10. The winding of claim 9 in which said remaining pancake coils have tap connections thereon.

References Cited

UNITED STATES PATENTS

| 2,723,379 | 11/1955 | Vogel | 336—70 |
| 3,246,270 | 4/1966 | Stein | 336—187 XR |
| 3,278,879 | 10/1966 | Stein | 336—187 |
| 3,299,385 | 1/1967 | Stein | 336—187 |

FOREIGN PATENTS 641,915   7/1962   Italy.

DARRELL L. CLAY, *Primary Examiner.*

T. J. KOZMA, *Assistant Examiner.*